H. RIETVELD.
SPATULA.
APPLICATION FILED JULY 11, 1921.
1,432,412. Patented Oct. 17, 1922.
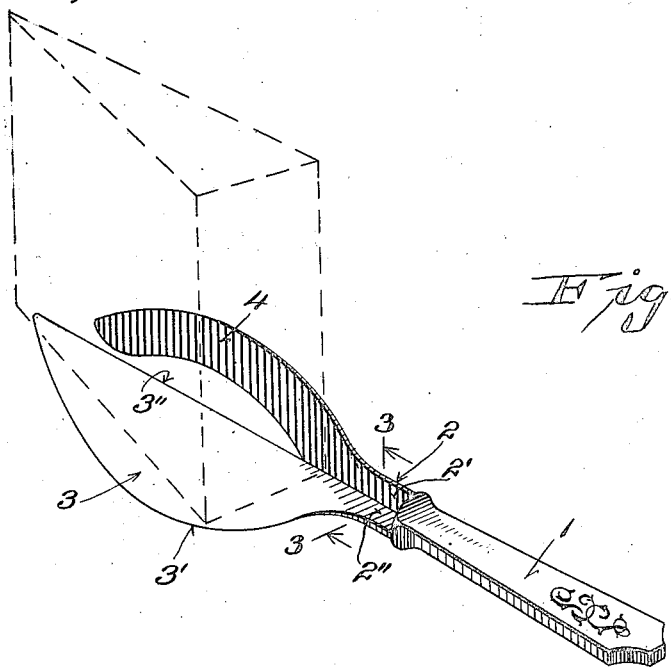
Fig. 1.
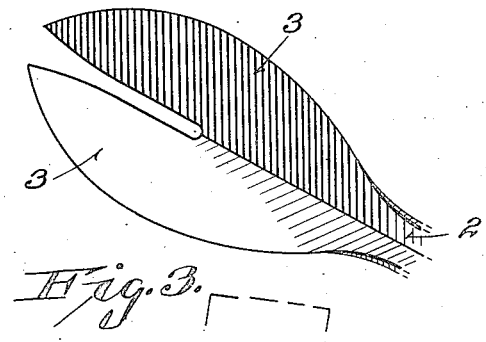
Inventor
Harry Rietveld Patented Oct. 17, 1922.

1,432,412

UNITED STATES PATENT OFFICE.

HARRY RIETVELD, OF MILWAUKEE, WISCONSIN.

SPATULA.

Application filed July 11, 1921. Serial No. 483,808.

*To all whom it may concern:*

Be it known that I, HARRY RIETVELD, a citizen of the United States, and resident of Milwaukee, in the county of Milwaukee and State of Wisconsin, have invented certain new and useful Improvements in a Spatula; and I do hereby declare that the following is a full, clear, and exact description thereof.

My invention refers to what is known in the trade as a spatula or serving knife and has for its object to provide a simple, economical, and effective household utensil of the above described type wherein a slice of cake or food product in bulk can be conveniently handled without danger of breakage or dropping the same from the blade.

With the above object in view the invention primarily contemplates the employment of a flat base blade having extended from its shank a backing blade, the same being connected at its base only to the backing blade, whereby flexure will result in connection with both blades to thus compensate when handling various food products in sectional pieces, it being understood that the backing blade will prevent the slice of cake or other food product from sliding from the base blade, whereby such slices can be conveniently handled. With the above object in view the invention consists in what is herein shown, described and claimed.

In the drawings:—

Figure 1 represents a perspective view of a spatula embodying the features of my invention.

Figure 2 is a fragmentary perspective view of another form of my invention, and

Figure 3 is a cross section through the shank of the spatula, the section being indicated by the line 3—3 of Figure 1.

Referring by characters to the drawing, 1 represents a handle of any suitable type having extended therefrom a shank 2 which shank is L-shaped in cross section forming a backing web 2' and a base web 2'' the base web of the shank has extended therefrom, a flat base blade 3, which in this exemplification of my invention is formed with a curved outer cutting edge 3' and a straight inner edge 3'' the said edges merging to a point for convenience when the blade is inserted under a slice of cake. The cutting edge can be used as such in many instances.

Extending from the backing web 2'' of the shank is a backing blade 4, which blade as shown in Figure 1, is curved upwardly and arranged with parallel edges, the inner edge being spaced a predetermined distance from the inner line of the base blade, and the end of the backing blade drops to a position close to said inner edge 3'' of the aforesaid base blade. In this exemplification of my invention the backing blade is preferably shorter than the main or base blade, and when base blade is inserted it will slide under the article to be lifted and thereafter the backing blade can be shifted to adjust its inner face in alignment with the wall of the slice of cake to be served, whereby it will lie snugly against the cake and thus prevent the slice from tipping as it rests against the blade, or from dropping when it is to be carried any distance.

In other words the serving knife or spatula primarily contemplates a pair of blades one or both of which may be flexible, said blades being positioned at approximately a right angle to each other, each extending from a common shank. Figure 2 of the drawing illustrates a modified form of my invention wherein the backing blade and base blade are similar in shape, it being understood that the blades are preferably flexible from the point of their separation with reference to the ends thereof. Obviously one or both of the blades can be provided with outer cutting edges or they may be flattened as the case may require.

While I have shown and described two simple forms of my invention it is understood that I may vary the shape of the blades and their structural features within the scope of the claims without departing from the spirit thereof. For example the backing blade may be hingedly or detachably connected to the base blade whereby it may lie flat.

I claim:

As a new article of manufacture a spatula comprising a shank L-shaped in cross section, the shank having extended from one of its webs a base blade and from its other web a backing blade, said blades being approximately at a right angle to each other and separated throughout from their shank portions.

In testimony that I claim the foregoing I have hereunto set my hand at Milwaukee, in the county of Milwaukee and State of Wisconsin.

HARRY RIETVELD.